June 27, 1950     E. A. MARTIN     2,512,955
SAND SPREADER
Filed Oct. 15, 1945
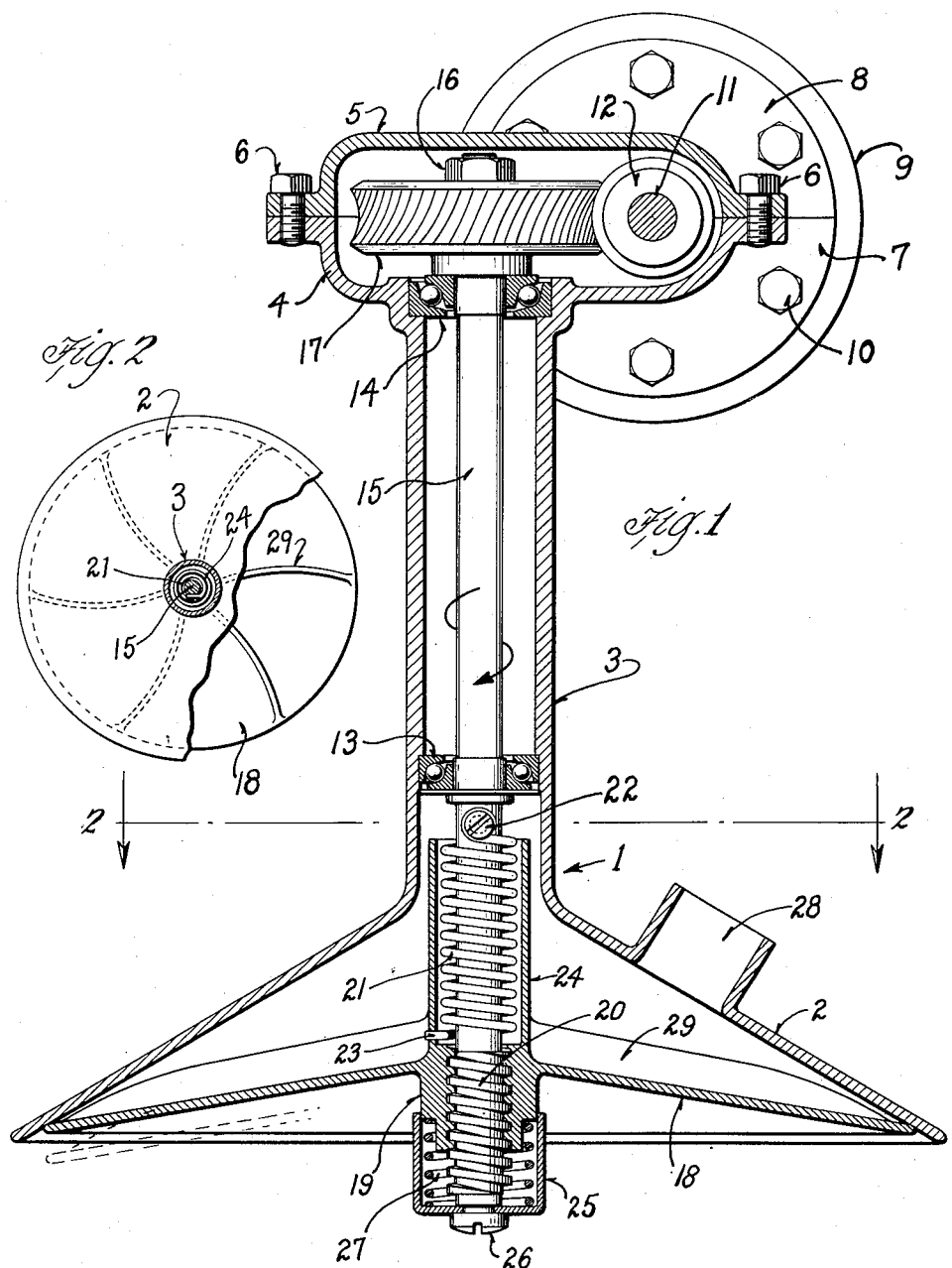
INVENTOR.
ELMER A. MARTIN
BY David A. Fox Patented June 27, 1950

2,512,955

UNITED STATES PATENT OFFICE 2,512,955

SAND SPREADER

Elmer A. Martin, Milwaukee, Wis.

Application October 15, 1945, Serial No. 622,391

6 Claims. (Cl. 198—128)

This invention relates to apparatus for spreading flowable granular material and resides more particularly in an improved form of such apparatus in which the opening and closing action thereof is performed by the rotatable slinging or projecting member which imparts the spreading force to the granules.

One object of this invention is to provide a granular material spreader of simplied design in which the rotating spreader member acts as a part of a shut-off gate thus eliminating the necessity for an additional gate member.

Another object is to provide an apparatus of the class described in which positive opening and closing and avoidance of plugging is facilitated by the rapid rotation of one of the members forming the gate mechanism.

Another object is to provide an apparatus of the class described which is conveniently controllable by the mere stopping and starting of the drive mechanism for the spreading or impelling assembly.

The above and other objects and advantages of the apparatus of this invention will be apparent from the description following. One form of the apparatus of this invention is herein described by way of illustration and not of limitation, reference being made to the accompanying drawing which forms a part hereof.

In the drawing:

Fig. 1 is a side view in elevation and in section of one form of the apparatus of this invention, and Fig. 2 is a top plan view in section with parts broken away viewed through the plane 2—2 indicated in Fig. 1.

As appears in the drawing the form of the apparatus of this invention there illustrated is provided with a main casing which comprises a lower bell chamber portion 2 and an upper vertical tubular shaft housing 3. The upper end of the shaft housing 3 is joined with a lower portion 4 of a reduction gear enclosure which is completed by a cap member 5. The parts 4 and 5 forming the reduction gear enclosures are held together by bolts 6 and extend rearwardly as viewed in the drawing to an integral connection with the split lower and upper halves 7 and 8, respectively, of a motor mounting flange to which a motor 9 is secured by bolts 10.

Motor 9 is provided with a shaft 11 extending into the gear reduction housing and carries a worm pinion 12 as shown. Mounted for rotation within the shaft housing 3 and carried upon spaced bearings 13 and 14 provided therefor is a vertical spreader shaft 15. Secured to the upper end of spreader shaft 15 by a nut 16 is a worm gear 17 disposed in meshing engagement with the worm pinion 12. By reason of this arrangement spreader shaft is rotated in the direction indicated by the arrow in Fig. 1 when the motor 9 is energized.

Mounted upon spreader shaft 15 and contained largely within the bell chamber 2 is a spreader disc 18 having a central hub portion 19. Hub 19 is internally threaded for threaded engagement with the threaded lower end 20 of the spreader shaft 15. In order to provide for the communication of torque from the shaft 15 to the disc 18 a resilient connection is provided in the form of the helical spring 21, the upper end of which is secured to the shaft 15 by means of the screw 22, and the lower end of which is secured to the hub 19 by a projection 23 which passes outwardly through an opening provided therefor in the hub 19 as shown. It will be observed from the arrangement described that the disc 18 will lag behind the rotation of shaft 15 an amount proportioned to the degree of torque transmitted from the shaft to the disc. As a result, disc 18 is downwardly displaced because of engagement with the thread 20.

In order to discourage the access of granular material to the thread 20, hub 19 is extended upwardly in the form of a protecting sleeve 24 which surrounds the spring 21. The lower exposed end of the thread 20 is likewise protected by a cap 25 secured to the end of the shaft 15 by the screw 26 within which the lower end of hub 19 is slidingly received. To augment the action of the spring 21 a compression spring 27 is contained within the cap 25 and acts upwardly against the lower end of the hub 19.

For the purpose of admitting a supply of granular material to the interior of the bell chamber 2 a tubular entrance channel 28 which may be connected with a supply bin is provided. In this way a continuous supply of granular material such as, sand or the like, to the bell chamber 2 may be maintained by gravity. Granular material is prevented from escaping, however, as long as the disc 18 remains in raised position as shown in full lines in Fig. 1. As soon as power is supplied to the motor 9, however, granular material packed against the disc 18 and engaging flutes 29 thereon resists rotation of the disc 18 and causes it to be moved downwardly to some such position as is indicated by dotted lines to the left in Fig. 1. As tension increases in springs 21 and 27, disc 18 is brought into rotation finally at a speed in unison with the rate of rotation of shaft 15. The granular material or sand is thus forcibly spread under a centrifugal action and continues to be so supplied and spread as long as power is admitted to the motor 9. The maintenance of the disc 18 in lowered position while the spreading action is taking place is dependent upon torque being transmitted from shaft 15 to the disc 18. This condition is fulfilled during the spreading action by reason of the torque requirements of the acceleration imparted to the material being spread.

The rate at which material is spread by the apparatus of this invention is dependent upon the characteristics of springs 21 and 27. With relatively weaker springs a relatively larger opening and a more rapid rate of delivery of material will occur. With relatively stiffer springs the opening is smaller and the rate of delivery of material less. It is contemplated therefore that supplementary springs 27 of varying sizes may be made available to the user so that simply by replacement of this part the spreading rate of the apparatus may be adjusted as desired.

The apparatus of this invention may obviously be operated by a source of power supply other than the motor 9 and such will usually be the case where the apparatus is employed for agricultural equipment, for example, equipment employed for the spreading of granular fertilizer material and the like. The apparatus, however, is of particular usefulness in road vehicles, particularly heavy trucks and busses where it is desired to spread salt-sand mixtures beneath the vehicle wheels where slippery road conditions are encountered. Where the apparatus is so employed, use of the independent driving motor 9 is of particular convenience since an electric switch for controlling the same may be located where it may be conveniently reached by the operator or where it is actuated in conjunction with operation of the vehicle brake mechanism.

I claim:

1. In a granular material spreader the combination comprising a supply chamber, means for admitting a supply of granular material to the interior of said chamber, a displaceable rotatable spreading disc associated with said chamber and adapted to approach and close the same, a driving shaft rotatably mounted with respect to said chamber for driving said spreading disc, endwise displacement means interposed between said driving shaft and disc including a substantially helical member attached to one of them and a follower member in cooperative engagement with said helical means attached to the other, said helical means and follower being adapted to cause endwise displacement of said disc away from said chamber to open the same upon relative rotation between said disc and said driving shaft caused by torque communicated to said disc from said driving shaft, and resilient means interposed between said disc and driving shaft adapted to urge said disc to closed position when torque is not communicated thereto by said driving shaft.

2. In a granular material spreader the combination comprising a downwardly opening bell chamber, means for admitting a supply of granular material to the interior of said bell chamber from above the same, a vertically movable rotatable spreading disc beneath said bell chamber adapted to close the same when in raised position, a driving shaft rotatably mounted with respect to said bell chamber for driving said spreading disc, endwise displacement means interposed between said driving shaft and disc including a substantially helical member attached to one of them and a follower member in cooperative engagement with said helical means attached to the other, said helical means and follower being adapted to cause endwise displacement of said disc away from said chamber to open the same upon relative rotation between said disc and said driving shaft caused by torque communicated to said disc from said driving shaft, and resilient means interposed between said disc and driving shaft adapted to urge said disc to closed position when torque is not communicated thereto by said driving shaft.

3. In a granular material spreader the combination comprising a downwardly opening bell chamber, means for admitting a supply of granular material to the interior of said bell chamber from above the same, a substantially horizontal rotatable downwardly displaceable spreading disc beneath said bell chamber adapted to close the same when in raised position, a driving shaft rotatably mounted with respect to said bell chamber for driving said spreading disc, a threaded connection between said driving shaft and disc adapted to cause vertical movement of said disc upon relative rotation between said driving shaft and said disc, and resilient means interposed between said shaft and disc adapted to transmit torque from said shaft to said disc.

4. In a granular material spreader the combination comprising a supply chamber, means for admitting a supply of granular material to the interior of said chamber, a displaceable rotatable spreading disc associated with said chamber and adapted to be displaced away from and to approach and close the same, a driving shaft rotatably mounted with respect to said chamber for driving said spreading disc, a threaded connection between said driving shaft and disc adapted to cause displacement of said disc away from said chamber when torque is communicated from said shaft to said disc, and resilient means interposed between said shaft and disc adapted to transmit torque from said shaft to said disc and to return said disc to closed position when said shaft is not rotating.

5. In a granular material spreader the combination comprising a supply chamber, means for admitting a supply of granular material to the interior of said chamber, a rotatable spreading disc having an internally threaded centrally disposed portion, a driving shaft rotatably mounted in said chamber and having an externally threaded portion in threaded engagement with said internally threaded portion of said disc, and a helical spring surrounding said shaft secured at one end to said shaft and at its opposite end to said disc.

6. A granular material spreader comprising a supply chamber, means for admitting a supply of granular material to the interior of said chamber, a gate for closing said chamber in the form of a rotatable spreading disc movable to and from a closed position with respect to said chamber and having an internally threaded centrally disposed portion, a driving shaft rotatably mounted in said chamber and having an externally threaded portion in threaded engagement with and extending through said internally threaded portion of said disc, the end of said shaft which extends through said disc being exposed on the side of said disc opposite to said chamber, and a compression spring interposed between the exposed end of said shaft and said disc adapted to act to urge the latter to a closed position with respect to said chamber and to become compressed upon movement of said disc away from said closed position.

ELMER A. MARTIN.

REFERENCES CITED

The following references are of record in the file of this patent:

UNITED STATES PATENTS

| Number | Name | Date |
|---|---|---|
| 145,112 | Lazarevitch | Dec. 2, 1873 |
| 797,073 | Perry | Aug. 15, 1905 |
| 853,870 | Ellerton | May 14, 1907 |
| 1,814,171 | Marsh | July 14, 1931 |
| 2,243,939 | Arndt | June 3, 1941 |